United States Patent Office 2,862,793
Patented Dec. 2, 1958

2,862,793

METHOD OF PREPARING CAUSTIC SODA

Karl H. Lauer, Tuscaloosa, Ala., assignor to Columbia-Southern Chemical Corporation, Allegheny, Pa., a corporation of Delaware No Drawing. Application November 16, 1956
Serial No. 622,518

3 Claims. (Cl. 23—185)

This invention relates to the preparation of caustic soda by the decomposition of aqueous sodium sulfate solutions with lime. More particularly, the instant invention is concerned with enhancement of the lime-sodium sulfate reaction by carrying it out in the presence of a special solvent.

Heretofore, numerous methods have been attempted to increase the yield of NaOH in the reaction of sodium sulfate with calcium hydroxide. Variations in temperature, pressure, concentrations and other factors have all been attempted and the results unsatisfactory.

According to the present invention, it has been discovered that the concentrations and yields of NaOH from the reaction of sodium sulfate and calcium hydroxide can be very significantly increased by conducting the reaction in the presence of a polyhydric alcohol-water solvent. As will be seen hereinafter, a glycerine-water solvent mixture, for example, having a ratio of about 65 to 35 enhances the reaction such that very high concentrations of NaOH are realized.

While the effect of the polyhydric alcohol in the reaction is not fully understood, it is postulated that the alcohol increases the solubility product of calcium hydroxide and decreases the solubility product of calcium sulfate. The effect of the addition of glycerine, for example, to water is reflected in the concentration of calcium ion, NaOH ion, and $SO_4$ ion at equilibrium.

Whatever the reason, however, the sodium hydroxide yield concentration is substantially greater than any heretofore realized. For instance, the final concentration of NaOH can be increased to as high as 55.7 grams of NaOH per liter with 98 percent by weight conversion of dissolved $Na_2SO_4$ by following the teachings of the present invention, this being a heretofore unprecedented achievement.

Since the rate of conversion and decomposition of sodium sulfate with lime is affected by both the nature and particle size of calcium hydroxide, it is preferable to use a high grade of hydrated lime to achieve speed of conversion. The present invention is not limited thereto, however.

The following examples are typical detailed embodiments contemplated within the scope of the instant invention, but it is not intended that the details should limit the scope of the invention.

*Example I*

Technical, freshly-burned lime (assay purity 95 percent by weight) was slaked with 2 liters of water until a paste of uniform consistency was realized. A 3.25 kilogram portion of glycerine was then added and the resulting mixture stirred vigorously for 5 minutes. Into this mixture was introduced 1420 grams of $Na_2SO_4$ and stirring continued for 45 minutes, after which the product was filtered through a cotton cloth and the resulting filter cake washed three times with three 150 milliliter portions of cold water.

The filtrate contained:

46.0 grams NaOH per kilogram or 235 grams of NaOH
2.1 grams $Ca(OH)_2$ per kilogram or 11 grams of $Ca(OH)_2$
5.1 grams $CaSO_4$ per kilogram or 25.8 grams of $CaSO_4$
1.5 grams $Na_2SO_4$ per kilogram or 7.7 grams of $Na_2SO_4$ The NaOH concentration was about 56 grams per liter solution. The filter cake contained about 1000 grams of $Na_2SO_4$ which had not dissolved, giving a conversion yield of about 98 percent by weight, calculated on $Na_2SO_4$ dissolved.

*Example II*

The filter cake produced in Example I and containing $Na_2SO_4$ was again washed with 1000 milliliters of water, i. e., it was washed with five 200 milliliter portions of water. Thus, one liter of wash water was obtained containing 480 grams $Na_2SO_4$, corresponding to an extraction of about 48 percent.

This solution was added to slaked lime prepared by treating 650 grams of burned lime with 1,000 milliliters of water. Glycerine (3.25 kilograms) was added to the resulting mixture with stirring, as defined in Example I, supra. Also, in the manner described in Example I, 940 grams of $Na_2SO_4$ was added, thus making a total of 1420 grams, and the mixture stirred for 45 minutes. The reaction product was then filtered and the filter cake washed as above.

The resulting filtrate contained:

238 grams of NaOH
10 grams of $Ca(OH)_2$
26 grams of $CaSO_4$
8 grams of $Na_2SO_4$ If desired, extraction of the filter cake can be repeated until only very little $Na_2SO_4$ is left in the cake.

The sodium sulfate used in the above examples was pure, technical $Na_2SO_4$ ($^{99}/_{100}$ percent).

A suitable slaked lime may be prepared by calcining calcium carbonate (C. P. grade) at 920° C. for six hours, cooling in a vacuum dessicator, grinding and sieving through a 0.125 millimeter screen. A solution of 3.6 grams NaOH in 360 milliliters of water is heated to the boiling point and 56 grams CaO added while stirring. After settling, the $Ca(OH)_2$ is washed with water, alcohol and ether and dried at 110° C.

*Example III*

Lime was slaked with water and glycerine added to form a solution containing lime and a solvent composed of 65 percent glycerine and 35 percent water. Next, $Na_2SO_4$ was added to the solution in the proportion given in the above examples, the mixture stirred and reaction allowed to proceed for 45 minutes at a temperature of 30° C. The resulting product was filtered and the filter cake washed as in Example I. The filtrate, including wash water, analyzed as follows:

33.0 grams NaOH per kilogram
2.1 grams $Ca(OH)_2$ per kilogram
4.9 grams $CaSO_4 \cdot 2H_2O$ per kilogram
14.8 grams $Na_2SO_4$ per kilogram The percent conversion of dissolved $Na_2SO_4$ was 80 percent by weight.

It can be seen from the foregoing that significantly high yields of NaOH by the reaction of $Na_2SO_4$ and slaked lime in the presence of a polyhydric alcohol-water solvent can be attained by the process of the present invention.

While glycerine gives exceptional results, other aliphatic polyhydric alcohols, such as the glycols, etc., are contemplated within the scope of the present invention. Furthermore, although the preferred polyhydric alcohol-water solvent ratio is about 65–35, ratios on the order of 85–15 and 50–50 also give good results. Likewise, reaction temperatures somewhat higher and lower than 30° C. are contemplated. The quantity of NaOH produced, however, seems to decrease by increasing the temperature to, say, about 50° C. or more.

While the present invention has been described with particular reference to detailed embodiments thereof, it is not intended that it be so limited, since it is obvious that numerous modifications are within the scope and spirit of the appended claims.

I claim:

1. In the process of producing caustic soda by reacting sodium sulfate with lime, the improvement which comprises carrying out the reaction in the presence of an aliphatic polyhydric alcohol-water solvent.

2. In the process of producing caustic sode by reacting sodium sulfate with lime, the improvement which comprises carrying out the reaction in the presence of a glycerine-water solvent.

3. The process according to claim 2 wherein the glycerine-water ratio is about 65:35.

References Cited in the file of this patent

UNITED STATES PATENTS

| | | |
|---|---|---|
| 1,974,608 | Giard | Sept. 25, 1934 |
| 2,418,372 | Smith | Apr. 1, 1947 |

OTHER REFERENCES

Mellor: "Comprehensive Treatise on Inorganic and Theoretical Chemistry," vol. 2, page 497, 4th paragraph, last two lines.

Gmelin-Kraut: "Handbuch der Anorganisch Chemie," Band 2, Abteilung 1, page 286, No. 5.